3,211,784
METHOD OF PREPARING ALPHA-AMINO-BETA-HYDROXYBUTYRIC ACID

Yoshioki Komachiya, Masahiko Takesada, and Setsuji Sakurai, Kanagawa-ken, Japan, assignors to Ajinomoto Co., Inc., Tokyo, Japan
No Drawing. Filed July 10, 1963, Ser. No. 294,175
Claims priority, application Japan, Aug. 14, 1962, 37/33,656
7 Claims. (Cl. 260—534)

This invention relates to a method of preparing synthetic alpha-amino-beta-hydroxybutyric acid, and more particularly to the preparation of a mixture of α-amino-β-hydroxybutyric acids rich in DL-(−)-threonine, hereinafter briefly referred to as threonine to distinguish it from DL-allothreonine.

Known methods of synthesizing α-amino-β-hydroxybutyric acid produce a mixture of DL-threonine and DL-allothreonine in which the latter prevails. A practical method for the separation of DL-threonine from DL-allothreonine has been disclosed in U.S. Patent 3,059,026. However, the known methods of synthesis provide a mixture relatively low in DL-threonine and thus can be combined with the separation method only to produce DL-threonine in low yields. The separation of the racemate into the optically active isomers also is known and is not directly relevant to this invention. This invention, however, will be understood to provide a step in the synthesis of L-(−)-threonine on an industrial scale.

We have found that a mixture consisting of about 60 percent threonine and 40 percent allothreonine is obtained in an overall yield of 50 percent from α-acetoxy-propionaldehyde or from α-hydroxypropionaldehyde. The synthesis of the first mentioned raw material by hydroformation of vinyl acetate has been disclosed in a commonly assigned U.S. application based on the Japanese application No. 28,724/1962. The last mentioned starting compound may be prepared according to the method of Wohl (Ber. 41,3602) by hydrolysis of lactic aldehyde diethylacetal.

According to our invention, α-acetoxypropionaldehyde or α-hydroxypropionaldehyde are converted to a mixture of threonine and allothreonine according to Strecker's synthesis, not previously applied to these two chemically unstable aldehydes. The reactants combined with the aldehydes are hydrogen cyanide and ammonia, either as an aqueous mixture produced from ammonia water and HCN, or other ionized salts yielding ammonium and cyanide ions in the aqueous medium, such as alkali metal cyanides and soluble salts of ammonia with a wide variety of acids, such as ammonium chloride. It is much easier to separate the desired product from a reaction mixture resulting from interaction between the aldehydes mentioned above with an aqueous ammoniacal solution of hydrogen cyanide than from a reaction mixture obtained by the use of alkali metal cyanides and ammonium salts, and the use of hydrogen cyanide and ammonia is therefore preferred.

The reaction between ammonia, hydrogen cyanide and the aldehydes mentioned take place in an aqueous medium over a wide temperature range, at least between 5° and 150° C., but the reaction rate is quite slow at low temperatures. A reaction rate which makes the process useful for industrial application is achieved at temperatures above 100° C., and we prefer quickly to heat the reactants to temperatures above 100° C., and to cool the reaction mixture quickly below 100° C. as soon as the reaction has proceeded to the desired extent. At the temperature of 130° C. at which the best results have been obtained, the optimum reaction time is of the order of a few minutes.

The influence of such process variables as the ratio of ammonia and HCN, time and temperature on the overall yield of DL-threonine and DL-allothreonine, and on the percentage of DL-threonine in the mixed α-amino-β-hydroxybutyric acids is illustrated in the following table. 0.1 mole α-acetoxypropionaldehyde was used in all tests the results of which are tabulated in the table, and details of operating conditions not specifically mentioned were as described hereinafter in Example 1.

TABLE

| HCN, g. | 25% NH₃ Solution, ml. | Reaction Time and Temp. | Amino-hydroxy-butyric Acid Yield, Percent | Percent Threonine in Amino-hydroxy-butyric Acids |
|---|---|---|---|---|
| 4.05 | 150 | 24 hrs., 5° C. | 41 | 60 |
| 4.05 | 150 | 3 hrs. 5° C.+20 hrs. 20° C. | 45 | 59 |
| 4.05 | 150 | From 20° C. to 130° C. in 5 min. and cooling. | 50 | 59 |
| 4.05 | 150 | From 20° C. to 120° C. in 5 min. and cooling. | 42 | 59 |
| 4.05 | 150 | From 20° C. to 130° C. in 5 min., 1 min. at 130° C. and cooling. | 42 | 58 |
| 4.05 | 60 | From 20° C. to 130° C. in 5 min. and cooling. | 35 | 59 |
| 2.70 | 150 | Same | 35 | 56 |
| 5.40 | 150 | Same | 38 | 58 |
| 4.05 | 200 | Same | 48 | 58 |

It is apparent from the table that the best yields are obtained with an approximately 50 percent excess of hydrogen cyanide over the amount of aldehyde present (one and one half moles of hydrogen cyanide per mole of aldehyde), and that about twenty moles of ammonia should be present for each mole of aldehyde.

The reaction between the α-acyloxypropionaldehyde, hydrogen cyanide and ammonia yields a mixture of aminonitriles, consisting of a major amount of α-amino-β-hydroxybutyronitrile and a minor amount of the corresponding β-acyl derivative. When this mixture is hydrolyzed, both aminonitriles are transformed into the α-amino-β-hydroxybutyric acids. We have found that the reaction mixture from Strecker's synthesis should be partly evaporated in a vacuum prior to hydrolysis to remove residual NH₃ and HCN. The hydrolysis may be carried out in an alkaline medium by dissolving the residue of the evaporation step in five to ten weights of water, heating to 90° C., and by gradually adding a caustic solution containing 20 to 30 percent NaOH or equivalent amounts of other caustic alkali until about 4 moles of alkali hydroxide have been added per mole of aldehyde.

The α-amino-β-hydroxybutyric acid may be recovered from the hydrolyzation mixture by neutralization and removal of inorganic salts, followed by concentration whereby the desired mixture of amino acids crystallizes. We prefer, however, to pass the hydrolyzation mixture over a weakly acidic cation exchange resin column which retains the alkali metal ions. The effluent is concentrated by evaporation and a water soluble organic solvent in which α-amino-β-hydroxybutyric acid is sparingly soluble is added to the aqueous residue until the amino acids crystallize. Methanol is the most convenient, though not the only, solvent that may be used for inducing precipitation of the acid.

The nitrile obtained by Strecker's reaction may also be hydrolyzed in an acid medium in a conventional manner. Hydrochloric and sulfuric acid are typical of the acids that promote hydrolysis. Refluxing of a concentrated nitrile solution with about four volumes concentrated hydrochloric acid for one hour causes complete hydrolysis. The hydrolysate may then be worked up by neutralization and crystallization in a conventional manner, or it is preferably passed over a strongly acidic cation exchange resin which selectively adsorbs the α-amino-β-hydroxybutyric acid from the acid solution. The desired product is then eluted with aqueous ammonium hydroxide solution, the eluate is concentrated by evaporation, and crystallization is induced in the concentrate as described above with reference to alkaline hydrolysis.

α-Hydroxypropionaldehyde and α-acyloxypropionaldehydes may be used interchangeably as starting materials in the Strecker reaction. The resulting nitriles, as far as they do not lose their acetyl radicals at an earlier stage, are hydrolyzed to the same end product in the last stage of our method.

The following examples are further illustrative of our invention, but it will be understood that it is not limited thereto.

*Example 1*

4.1 grams hydrogen cyanide were dissolved in 150 milliliters of a 25 percent aqueous solution of ammonia. 11.6 grams α-acetoxypropionaldehyde were added gradually with stirring and cooling to keep the mixture at room temperature. The mixture was heated in a tube to 130° C., which required five minutes, and immediately thereafter cooled down to less than 100° C., and further to room temperature. The liquid obtained was evaporated in a vacuum.

The residue weighed 23 grams. 80 grams concentrated hydrochloric acid were added, and the mixture was stirred one hour while it was being held at 50° C. 80 grams water were added at this stage, and the solution was refluxed for one hour. The hydrolyzate formed was evaporated in a vacuum until it was almost free from hydrochloric acid. The residue was diluted with water to 300 milliliters, and the solution produced in this manner was passed over a column containing 400 milliliters of a granular, strongly acidic cation exchange resin of the polystyrene sulfonic acid type.

The α-amino-β-hydroxybutyric acid retained on the resin was eluted with 250 milliliters 6.3 percent aqueous ammonia solution followed by 400 milliliters water, and the eluate was evaporated to dryness in a vacuum. The residue weighing 13 grams was dissolved in a minimum of water to which enough methanol was added to make the total volume 60 milliliters. The crystals formed after standing overnight weighed 6.0 grams, decomposed at 219 to 221° C., and were free of glycine. The ratio of threonine to allothreonine in the aminohydroxybutyric acid was 60 to 40.

*Example 2*

The process of Example 1 was repeated to the point where a crude mixture weighing 23 grams was obtained from Strecker's reaction by evaporation. This residue was mixed with 100 milliliters water, and the aqueous mixture was heated to 90° C. 64 grams of an aqueous 25% sodium hydroxide solution were added gradually and with stirring over a period of two hours. Stirring at 90° C. was continued for an additional hour. Nitrogen was passed through the liquid during hydrolysis to remove the ammonia formed.

After cooling, the reaction mixture was passed over a weakly acid cation exchange resin of the polymethacrylic acid type which retained the alkali metal ions. The effluent combined with 300 milliliters of aqueous washing liquid from the column was concentrated under reduced pressure, and the liquid aqueous reside was mixed with 80 milliliters methanol. After four days, the crystals precipitated were separated from the mother liquor. They weighed 4.5 grams and decomposed at 214–216° C. Analysis by paper chromatography revealed the presence of a very small amount of glycine. The ratio of threonine to the combined amounts of threonine and allothreonine present was 57 percent.

*Example 3*

The process of Example 1 was repeated, but 37 grams of a 20 percent aqueous solution of α-hydroxypropionaldehyde were used instead of the 11.6 grams α-acetoxypropionaldehyde described in Example 1.

The crystals ultimately obtained weighed 5.8 grams, decomposed at 216 to 218° C., were free from glycine, and the percentage of threonine in the combined threonine and allothreonine was 60 percent.

While the invention has been described with particular reference to specific embodiments, it is to be understood that it is not limited thereto, but is to be construed broadly and restricted solely by the scope of the appended claims.

What we claim is:

1. A method of preparing α-amino-β-hydroxybutyric acid rich in threonine which comprises reacting an aldehyde selected from the group consisting of α-hydroxypropionaldehyde and α-acetoxypropionaldehyde in an aqueous medium with hydrogen cyanide and ammonia to form an aminonitrile, and hydrolyzing said aminonitrile.

2. A method as set forth in claim 1, wherein said aldehyde is reacted with an excess of said hydrogen cyanide and of said ammonia.

3. A method as set forth in claim 2, wherein the excess of said hydrogen cyanide is approximately 50 percent, and the excess of said ammonia is greater than the excess of said hydrogen cyanide.

4. A method as set forth in claim 1, wherein said aldehyde is reacted with said hydrogen cyanide and said ammonia at a temperature above 100° C. and 150° C.

5. A method of preparing α-amino-β-hydroxybutyric acid rich in threonine which comprises reacting an aldehyde selected from the group consisting of α-hydroxypropionaldehyde and α-acetoxypropionaldehyde with an excess of hydrogen cyanide and ammonia in an aqueous medium at a temperature between 5° C. and 150° C., whereby aminonitriles are formed, and hydrolyzing said aminonitriles.

6. A method as set forth in claim 5, wherein said aqueous medium containing said aldehyde, said hydrogen cyanide, and said ammonia is heated to a temperature of approximately 130° C., and rapidly cooled from said temperature to a temperature lower than 100° C.

7. A method as set forth in claim 5, wherein at least one of said ammonia and of said hydrogen cyanide is present in said medium as an ionized salt.

References Cited by the Examiner

Fischer: Ber., vol. 35, page 3787 (1902).
Greenstein: Chemistry of the Amino Acids, vol. 1, pp. 698–700 (1961).

LORRAINE A. WEINBERGER, *Primary Examiner.*

LEON ZITVER, *Examiner.*